(12) United States Patent
Enloe et al.

(10) Patent No.: US 11,433,646 B2
(45) Date of Patent: Sep. 6, 2022

(54) METALLIC COMPONENT AND METHOD OF REDUCING LIQUID METAL EMBRITTLEMENT USING LOW ALUMINUM ZINC BATH

(71) Applicant: GM GLOBAL TECHNOLOGY OPERATIONS LLC, Detroit, MI (US)

(72) Inventors: Charles Enloe, Grosse Pointe Woods, MI (US); Michael J. Karagoulis, Okemos, MI (US); Curt D. Horvath, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 282 days.

(21) Appl. No.: 16/394,060

(22) Filed: Apr. 25, 2019

(65) Prior Publication Data
US 2020/0338856 A1 Oct. 29, 2020

(51) Int. Cl.
*B32B 15/01* (2006.01)
*C23C 2/06* (2006.01)
(Continued)

(52) U.S. Cl.
CPC ............ *B32B 15/013* (2013.01); *B23K 11/11* (2013.01); *B23K 11/115* (2013.01);
(Continued)

(58) Field of Classification Search
CPC ....... B32B 15/013; B32B 15/01; B32B 15/04; B32B 15/043; B32B 15/18; B32B 15/20;
(Continued)

(56) References Cited

U.S. PATENT DOCUMENTS 10,329,639 B2 6/2019 Enloe et al.
2008/0308194 A1* 12/2008 Corquillet ............... C22C 38/06
148/531
(Continued)

FOREIGN PATENT DOCUMENTS

CN 107075653 A 8/2017
CN 107109608 A 8/2017
(Continued)

OTHER PUBLICATIONS

Machine Translation, Minoru, JP 59-123751, Jul. 1984. (Year: 1984).*
(Continued)

*Primary Examiner* — Michael E. La Villa
(74) *Attorney, Agent, or Firm* — Harness, Dickey & Pierce, P.L.C.

(57) ABSTRACT

A metallic component includes a core formed of steel. A zinc alloy layer is disposed on the core. The zinc alloy layer is formed of zinc and a very small amount of aluminum, such as 0.14 weight percent or less. A method of creating a component includes providing a steel core, providing a zinc bath consisting of essentially of 0.01 to 0.14 weight percent aluminum, and hot dipping the steel core into the zinc bath to form a zinc coating on the steel core resulting in a zinc-coated steel component. The aluminum may be provided in even lower contents, such as less than 0.08 weight percent, or even less than 0.05 weight percent. The zinc-coated steel component may then be spot welded to another component without first annealing the zinc-coated component. Rather, heat treating is performed locally at the weld joint by the welding procedure alone.

16 Claims, 2 Drawing Sheets

(51) Int. Cl.
| | |
|---|---|
| *C22C 18/04* | (2006.01) |
| *B23K 11/11* | (2006.01) |
| *B23K 11/16* | (2006.01) |
| *C23C 28/02* | (2006.01) |
| *C23C 2/28* | (2006.01) |
| *C23C 2/34* | (2006.01) |
| *C21D 1/26* | (2006.01) |
| *C23C 28/00* | (2006.01) |
| *C23C 30/00* | (2006.01) |
| *B32B 15/20* | (2006.01) |
| *B32B 15/04* | (2006.01) |
| *C23C 2/40* | (2006.01) |
| *B32B 15/18* | (2006.01) |
| *C22C 18/00* | (2006.01) |
| *B23K 103/04* | (2006.01) |

(52) U.S. Cl.
CPC .......... *B23K 11/166* (2013.01); *B32B 15/01* (2013.01); *B32B 15/04* (2013.01); *B32B 15/043* (2013.01); *B32B 15/18* (2013.01); *B32B 15/20* (2013.01); *C21D 1/26* (2013.01); *C22C 18/00* (2013.01); *C22C 18/04* (2013.01); *C23C 2/06* (2013.01); *C23C 2/28* (2013.01); *C23C 2/285* (2013.01); *C23C 2/34* (2013.01); *C23C 2/40* (2013.01); *C23C 28/023* (2013.01); *C23C 28/025* (2013.01); *C23C 28/322* (2013.01); *C23C 28/3225* (2013.01); *C23C 30/00* (2013.01); *C23C 30/005* (2013.01); *B23K 2103/04* (2018.08); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/24967* (2015.01); *Y10T 428/26* (2015.01); *Y10T 428/265* (2015.01)

(58) Field of Classification Search
CPC .. C23C 2/285; C23C 2/28; C23C 2/34; C23C 2/06; C23C 2/40; C23C 28/023; C23C 28/025; C23C 28/322; C23C 28/3225; C23C 30/00; C23C 30/005; C21D 1/26; B23K 11/166; B23K 11/115; B23K 11/11; B23K 2103/04; C22C 18/04; C22C 18/00; Y10T 428/12799; Y10T 428/12951; Y10T 428/12958; Y10T 428/12965; Y10T 428/12972; Y10T 428/24967; Y10T 428/26; Y10T 428/265
See application file for complete search history.

(56) References Cited

U.S. PATENT DOCUMENTS

2017/0291246 A1\* 10/2017 Sigler ................. B23K 11/20
2019/0040487 A1    2/2019 Enloe et al.

FOREIGN PATENT DOCUMENTS

| CN | 111850444 A | 10/2020 |
| JP | 59-123751 | \* 7/1984 |
| JP | 2006-299290 A | \* 11/2006 |

OTHER PUBLICATIONS

Machine Translation, Kiyokazu, JP 2006-299290 A,, Nov. 2006. (Year: 2006).\*
Lihua Chen, "Short Term Formation of the Inhibition Layer During Continuous Hot-Dip Galvanizing," McMaster University, 2007.
R.M. Bruscato, "Liquid Metal Embrittlement of Austenitic Stainless Steel When Welded to Galvanized Steel," Welding Research Supplement, Dec. 1992, p. 455-s to 460-s.
First Office Action for Chinese Patent Application No. 202010333893.7 dated Jan. 19, 2022, with correspondence dated Jan. 24, 2022, from China Patent Agent (H.K.) Ltd summarizing content; 11 pages.

\* cited by examiner

METALLIC COMPONENT AND METHOD OF REDUCING LIQUID METAL EMBRITTLEMENT USING LOW ALUMINUM ZINC BATH

FIELD

This disclosure generally relates to zinc-coated steel sheet or objects and methods for applying a zinc coating to steel sheet or objects.

INTRODUCTION

Steel is often galvanized with a zinc coating to protect the steel from rusting. However, some zinc-coated steels are prone to exhibit liquid metal embrittlement (LME) after spot welding. This phenomena is especially significant in spot welds of transformation induced plasticity (TRIP), medium manganese and twinning induced plasticity (TWIP) and other steels generally considered to be part of what is called $3^{rd}$ Generation Advanced High Strength Steels ($3^{rd}$ Gen AHSS's) being developed for the automotive industry, and hence there is renewed interest in methods to reduce or eliminate the occurrence of weld cracks and the corresponding reduction in weld strength and ductility. Accordingly, it is desirable to protect steel from rusting by the use of a zinc-coating, while maintaining the ability to spot weld the steel components and retain weld integrity.

SUMMARY

The present disclosure provides a zinc-coated steel and a method for zinc-coating steel that reduces susceptibility to liquid metal embrittlement in steels that are spot welded. A zinc bath chemistry having a low amount of aluminum is used to create a zinc coating on a steel component having a reduced inhibition layer with greater permeability for iron interdiffusion with zinc during the resistance spot welding process of hot-dip galvanized steels. Providing for a reduced thickness and/or more permeable inhibition layer allows greater interdiffusion of zinc and iron without the need for post coating annealing of the zinc coating. By allowing for greater interdiffusion of iron into zinc, zinc concentrations are reduced, as is the tendency for liquid metal embrittlement.

In one form, which may be combined with or separate from other forms disclosed herein, a metallic component is provided that includes a core formed of steel susceptible to LME. A zinc alloy layer is disposed on the core. The zinc alloy layer is formed of a majority of zinc and no greater than 0.08 weight percent aluminum, in this example.

The zinc alloy layer may consist essentially of 0.01 to 0.08 weight percent aluminum and the balance zinc, or 0.01 to 0.05 weight percent aluminum and the balance zinc, or 0.05 weight percent or less aluminum. The core may be formed of transformation-induced plasticity (TRIP) steel. The metallic object may have a reduced inhibition layer disposed between the zinc alloy layer and the core, the inhibition layer contacting the core and the zinc alloy layer. In some cases, the inhibition layer may have a thickness in the range of 10 to 30 nanometers. A second component may be spot welded to the zinc-coated steel component.

In another form, which may be combined with or separate from the other forms described herein, a method of creating a component is provided. The method includes providing a steel core and providing a zinc bath consisting essentially of 0.01 to 0.14 weight percent aluminum and the balance zinc. Other elements may be included in the zinc bath, typically in trace amounts. The method includes hot dipping the steel core into the zinc bath to form a zinc coating on the steel core resulting in a zinc-coated steel component. The method further includes welding the zinc-coated steel component to a second component to create an assembly having a weld joint.

In yet another form, which may be combined with or separate from the other forms disclosed herein, a method of creating a component is provided that includes providing a steel core and providing a zinc bath consisting of essentially of 0.01 to 0.08 weight percent aluminum. The method further includes hot dipping the steel core into the zinc bath to form a zinc coating on the steel core resulting in a zinc-coated steel component.

Any variation of the disclosed methods may also include refraining from annealing the zinc-coated steel component in an annealing furnace after the step of hot dipping the steel core into the zinc bath. A second component may be spot welded to the first component, and the second component may also be formed of a zinc-coated steel. The step of welding may include performing a resistance spot welding process between the zinc-coated steel component and the second component. The steel core may be formed of a transformation-induced plasticity (TRIP) steel. The zinc bath may be provided consisting essentially of 0.01 to 0.14 weight percent aluminum and the balance zine, 0.01 to 0.08 weight percent aluminum and the balance zinc, or 0.01 to 0.05 weight percent aluminum and the balance zinc, by way of example.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
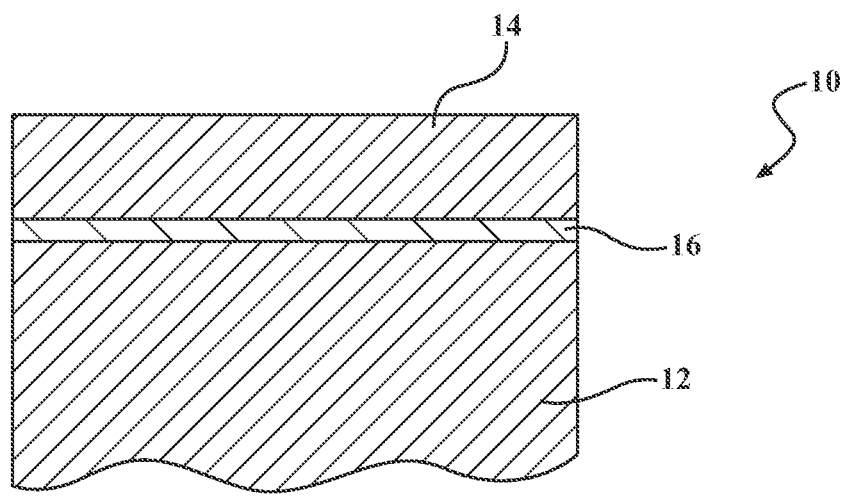
FIG. 1 is a schematic, cross-sectional view of a multilayer component, in accordance with the principles of the present disclosure.

The following description is merely exemplary in nature and is not intended to limit the present disclosure, its applications, or its uses.

In the drawings, like reference numbers correspond to like or similar components whenever possible throughout the several figures. While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

Referring now to FIG. 1, a multilayer component is illustrated and generally designated at 10. The component 10 includes a core 12 that is formed of steel. The steel may be an advanced high strength steel that includes retained austenite, such as one of several types of transformation-induced plasticity (TRIP) steel. TRIP steels may include any steel in which a metastable austenite transforms displacively to martensite (BCT or HCP), with resultant work hardening. Characteristics of TRIP steels result in favorable combinations of strength and ductility but may generally be subject to liquid metal embrittlement (LME) (without the improvements described herein). Representative steels include any generation of TRIP, including, but are not limited to: TBF (TRIP-aided bainitic ferrite), Q&P (quench and partition), and carbide free bainite. TRIP steel generally includes at least 5 percent retained austenite, in addition to a material composition that may include, without limitation: ferrite, martensite, and bainite. The core 12 could alternatively be formed of another steel, such as twinning-induced plasticity (TWIP) steel. TWIP steel includes higher levels of Manganese (Mn), beyond 20 weight-percent (wt %), compared to TRIP steel.

In one form, the core 12 may generally include a carbon (C) content of less than, or equal to, 0.4 weight-percent (wt %), although some configurations have less than, or equal to, 0.2 weight-percent; silicon (Si) content greater than, or equal to, 0.5 weight-percent, but often greater than 0.75 weight-percent; and manganese (Mn) content of, for example, between 2 and 5 weight-percent, although medium manganese TRIP steels may include Mn levels of between 5 and 12 weight-percent. In some configurations, aluminum (Al) may also be included in the TRIP steel forming the core 12, at between 0.5 and 2.0 weight-percent. The aluminum may be substituted for some of the silicon or may be used in conjunction therewith. Aluminum, like silicon, minimizes carbide formation and growth, which helps retain austenite within the TRIP steel matrix.

The multilayer component 10 also includes a zinc-based layer 14 disposed on the core 12. The zinc-based layer 14 may also be referred to as a zinc coating or a galvanic coating or zinc galvanic coating. The zinc-based layer 14 offers cathodic protection, such that the zinc-based layer 14 acts as a sacrificial layer and corrodes instead of the underlying steel component, generally even where a portion of the underlying steel is exposed. As used herein, the zinc-based layer 14 refers to a coating of elemental zinc (Zn) or a zinc alloy having greater than 50-percent zinc. Numerous alloying elements may be used with zinc for galvanizing steel components, including the TRIP steel described herein. The zinc-based layer 14 includes a small amount of aluminum and a majority zinc. For example, the zinc-based layer 14 may include aluminum up to 0.14 weight percent in one example, up to 0.08 weight percent in another example, and up to 0.05 weight percent in yet another example. In some examples, the aluminum is included in an amount of at least 0.01 weight percent. The balance of the zinc-based layer 14 consists essentially of zinc. Other elements may be included in the zinc-based layer 14, typically in trace amounts not exceeding 100 ppm. For example, the zinc-based layer 14 may optionally include antimony, lead, and/or cadmium, each at levels not exceeding 100 ppm. Other trace elements that are also included in steel could also exist in the zinc bath, such as iron, silicon, or manganese.

The zinc-based layer 14 may be applied by hot dipping the steel core 12 in a galvanization zinc bath, which will be described in further detail below. The zinc bath includes a majority zinc and a small amount of aluminum. The amount of aluminum included in the zinc bath are lower than what is used in typical hot dip zinc baths. Thus, galvanizing the component 10 may occur by hot-dipping the core 12 in a galvanization bath. Alternatively, the zinc-based layer 14 may be applied via electro-galvanizing.

Upon application of the zinc-based layer 14 to the core 12, a thin inhibition layer 16 is formed by intermetallics between the core 12 and the zinc-based layer 14. For example, the inhibition layer 16 is generally formed of $Fe_2Al_5$. The inhibition layer 16 protects the zinc coating by retarding the formation of Fe—Zn intermetallic compounds at the interface between the steel core 12 and the zinc-based layer 14, thus enhancing the adhesion and formability of the zinc-based layer 14.

The inhibition layer 16 is very thin, even thinner than would normally be expected in typical hot dip procedures where greater amounts of aluminum are included in the zinc bath and in the resultant zinc-based layer 14. Thus, the inhibition layer 16 may have a thickness in the range of 10-30 nanometers, by way of example. As a result of the thinness of the inhibition layer 16, the zinc from the zinc-based layer 14 and the iron from the steel core 12 inter-diffuse with one another upon application of the zinc-based layer 14 to the core 12.

TRIP steels or other high-strength steels, as may be used to form the core 12, may be cold-worked into high-strength, three-dimensional shapes. In turn, the high-strength, three-dimensional shaped component 10 may be attached, such as through welding techniques, to other components. However, many TRIP steels are subject to liquid metal embrittlement (LME) when welded. The multilayer component 10, and methods of producing the same, described herein, provide improved weldability over other TRIP steels, as the features of the multilayer component 10 make it relatively less susceptible to LME.

The multilayer component 10 may be welded to another component, such as one formed from the same type of TRIP steel as used in the component 10, or the component 10 may be welded to a component formed from differing materials, including, without limitation: other types of advanced high-strength steel (AHSS), high-strength steel (HSS), different grades or types of TRIP steel, TRIP steel lacking the decarburized layers 14, dual-phase steel (DP), aluminum alloy, or other alloys.

The high-strength, three-dimensional components formed from the multilayer component 10 described herein may be incorporated into many devices, such as vehicles. Such high-strength structures are particularly suitable for use in components of an automobile or other rolling platforms, including, without limitation: motorcycles, boats, tractors, buses, mobile homes, campers, and tanks. However, they may also be used in a variety of other industries and applications, including, without limitation: aerospace components, consumer goods, office equipment and furniture, industrial and construction equipment and machinery, farm equipment, or heavy machinery.

Other exemplary structures that have frames that can be manufactured by the current technology include construction and buildings, such as houses, offices, bridges, sheds, warehouses, and devices. It will be appreciated by those skilled in the art that numerous other components may be fabricated by the methods of the present disclosure, and that such additional components are deemed to be within the scope of the present disclosure.

Specific structural components that may be formed of the component 10 include, without limitation: those used in automotive applications including, but not limited to, rocker rails, engine rails, structural pillars, A-pillars, B-pillars, C-pillars, D-pillars, bumper, hinge pillars, cross-members, body panels, structural panels, door panels, and door components, interior floors, floor pans, roofs, hoods, exterior surfaces, underbody shields, wheels, storage areas, including glove boxes, console boxes, trunk lids, trunks, trunk floors, truck beds, lamp pockets and other components, shock tower cap, control arms and other suspension, undercarriage or drive train components, and the like. While exemplary components may be illustrated and described throughout the specification, it is understood that the inventive concepts in the present disclosure may also be applied to any structural component capable of being formed of galvanized steel alloy. Specifically, the present disclosure is particularly suitable for any component subject to loads or requiring cathodic protection.

Figure 2:
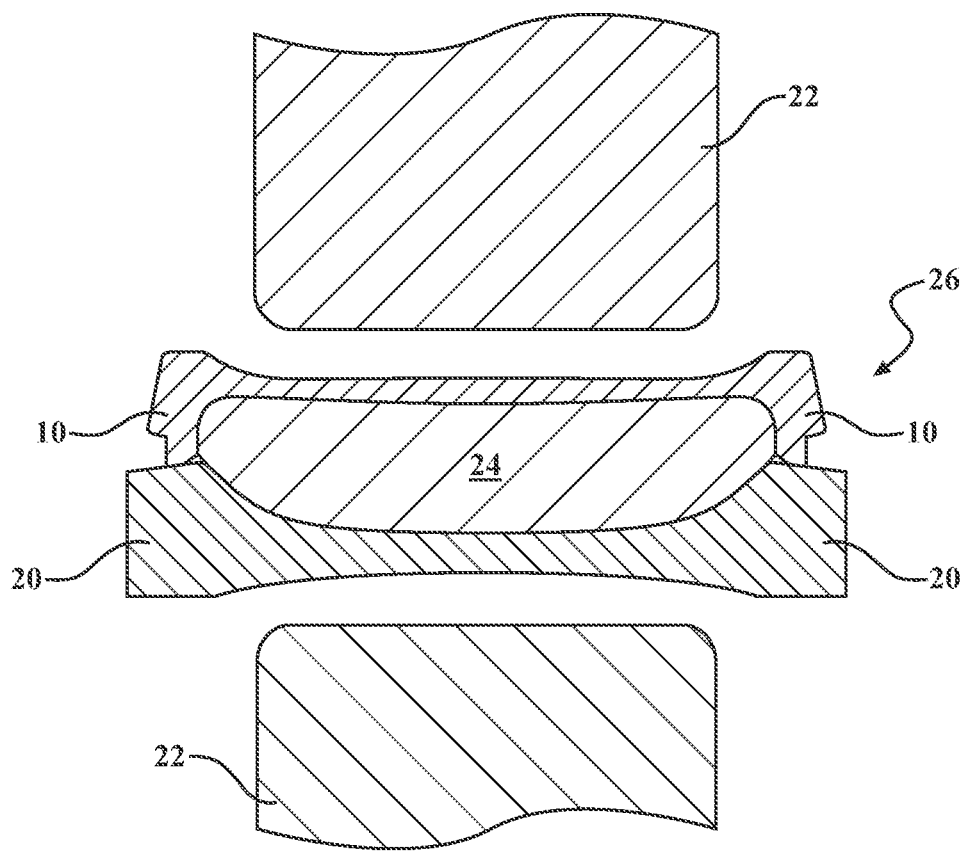
FIG. 2 is a schematic illustration of an assembly including the component of FIG. 1 resistance spot welded to an adjacent component, according to the principles of the present disclosure.

Referring now to FIG. 2, the component 10 is formed into a three-dimensional shape and welded to a second component 20. The components 10, 20 are attached via resistance spot welding (RSW) techniques. However, the components 10, 20 may alternative be joined by other methods, such as laser spot welding (LSW) techniques or MIG welding.

The second component 20 may be substantially similar to the zinc-coated steel component 10 or may be formed of different metals. A pair of weld caps 22, which are shown retracted, are pressed against the components 10, 20, and a voltage is applied therebetween. Current flowing between the weld caps 22 resistively heats the metals, particularly at a junction between each of the components 10, 20, which creates a liquid region. After removal of the voltage, the liquid region solidifies to form a weld nugget or weld joint 24, which ties portions of the first component 10 and the second component 20 together.

The zinc-based coating 14 (shown in FIG. 1) melts along much of the weld nugget 24 during the resistance spot welding (RSW) process. Liquid metal embrittlement (LME) may occur through different mechanisms resulting, at least partially, from liquid zinc. Zinc has a melting temperature of 420° C. At temperatures above 420° C., at which liquid zinc is present, zinc begins to wet iron grain boundaries, such as those within TRIP steels, that may result in LME along regions of the weld nugget 24 where the zinc coating melts. Furthermore, small cracks, such as those caused by tensile stresses, may be exacerbated by wetting from liquid zinc. Where temperatures are above the melting point of zinc or zinc alloy for some high-strength or advanced high-strength steels and the steel core 12 is exposed to tensile stress, the liquid zinc can wet exposed grain boundaries of the TRIP steel and cause de-cohesion or separation along the grain boundaries. Therefore, the zinc attacks grain boundaries which can form cracks associated with LME. However, due to amount of aluminum content used in the zinc coating, LME caused by RSW is greatly reduced.

Figure 3:
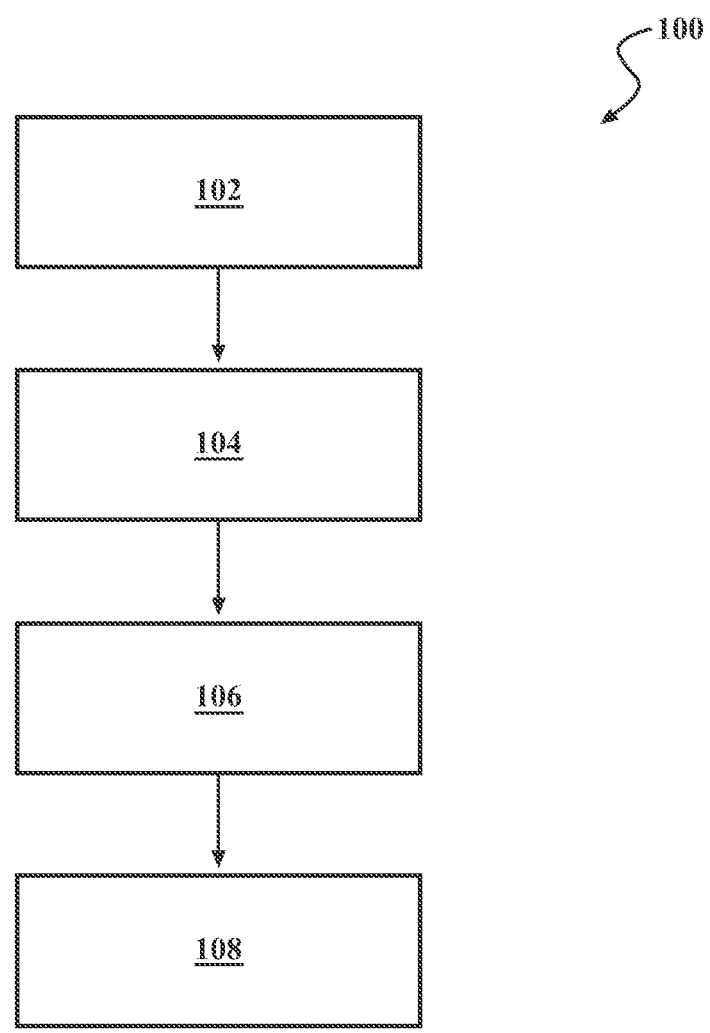
FIG. 3 is a block diagram illustrating a method of forming a component, such as the component of FIG. 1 and/or FIG. 2, in accordance with the principles of the present disclosure.

Referring now to FIG. 3, and with continued reference to FIGS. 1-2, there is shown a block diagram illustrating a method 100 for creating a component, such as the component 10, that mitigates LME during welding.

The method 100 includes a step 102 of providing a steel core, such as the steel core 12 described above. For example, the steel core 12 may be formed of a TRIP steel and may be cold-rolled or cold-worked into a desired thickness and/or shape. The steel core 12 may be annealed to prepare the core 12 for subsequent cold-working to a final component shape. For example, heat treatment may be used to create a final grain structure in the core 12 that includes retained austenite.

The method 100 further includes a step 104 of providing a zinc bath consisting of up to 0.14 weight percent aluminum and the balance zinc. In some forms, the zinc bath contains no greater than 0.08 weight percent aluminum and the balance zinc, and in some forms, the zinc bath contains no greater than 0.05 weight percent aluminum and the balance zinc. In some examples, the aluminum is included in an amount of at least 0.01 weight percent. Other elements may be included in the zinc bath, typically in trace amounts not exceeding 100 ppm. For example, the zinc bath may optionally include antimony at a level not exceeding 100 ppm. Accordingly, the zinc bath may include 0 to 0.001 weight percent or 0 to 0.005 weight percent trace elements.

The method 100 then includes a step 106 of hot dipping the steel core 12 into the zinc bath to form a zinc coating 14 on the steel core 12, resulting in a zinc-coated steel component 10. After hot dipping the core 12 into the zinc bath to form the zinc-coated steel component 10, cold-working may then be applied to form the core 12 into a three-dimensional shape, if desired, for example, if the core 12 has not already been shaped into the final desired shape.

After applying the zinc coating to the core 12 in the hot dipping step 106 to form the zinc-coated steel component 10, the method 100 may include a step 108 of welding the component 10 to an adjacent component 20, as shown in FIG. 2. The welding step 108 includes welding the first component 10 to the second component 20 to form a weld joint 24 therebetween.

In some variations, no annealing is performed between the step 106 of applying the zinc coating and the step 108 of welding. Rather, an accelerated alloying process occurs in the local zones in which the welding step 108 itself is performed, by virtue of the heat applied during the welding step 108. Thus, the method 100 may include refraining from annealing the zinc-coated steel component 10 in an annealing furnace after the step 106 of hot dipping the steel core 12 into the zinc bath.

In some forms, the welding step 108 includes performing a resistance spot welding (RSW) process between the zinc-coated steel component 10 and the second component 20, as illustrated in FIG. 2. The RSW process typically includes creating a series of weld joints 24 between the components 10, 20 by energizing the electrodes 22 and contacting the components 10, 20 with the electrodes 22 at several locations along the components 10, 20. As an alternative to RSW, the welding step 108 could include laser spot welding (LSW) or MIG welding, by way of example. Performing the welding step 108 results in a welded assembly 26 (shown in FIG. 2). The welded assembly 26 may then be subject to post-processing prior to final assembly.

The low aluminum zinc bath allows the hot dipping process to create a zinc coating on the steel core 12 that has a reduced inhibition layer 16, as described above. The reduced inhibition layer 16 allows greater interdiffusion of zinc and iron from between the zinc coating 14 and the steel core 12. Greater interdiffusion of zinc and iron results in reduced LME upon subsequent welding, while maintaining the resistance to corrosion created by applying the zinc coating 14 to the steel core 12.

The detailed description and the drawings or figures are supportive and descriptive of the subject matter discussed herein. While some examples have been described in detail, various alternative designs, configurations, and embodiments exist. The description of the present disclosure is merely exemplary in nature and variations that do not depart from the gist of the present disclosure are intended to be within the scope of the present disclosure.

What is claimed is:

1. A metallic component comprising:
   a core formed of steel;
   a zinc alloy layer comprising zinc and aluminum disposed on the core, the zinc alloy layer comprising a majority of zinc and less than 0.05 weight percent aluminum; and
   an inhibition layer disposed between the zinc alloy layer and the core, the inhibition layer contacting each of the core and the zinc alloy layer, wherein the inhibition layer has an average thickness that is greater than or equal to about 10 nanometers to less than or equal to about 30 nanometers.

2. The metallic component of claim 1, the core comprising transformation-induced plasticity (TRIP) steel.

3. The metallic component of claim 1, wherein the zinc alloy layer consists essentially of 0.01 to less than 0.05 weight percent aluminum and the balance zinc.

4. The metallic component of claim 1, further comprising a second component spot welded to the core having the zinc alloy layer disposed thereon.

5. A metallic component comprising:
   a core formed of steel;
   a zinc alloy layer comprising zinc and aluminum disposed on the core, the zinc alloy layer comprising a majority of zinc and less than or equal to 0.08 weight percent aluminum; and
   an inhibition layer disposed between the zinc alloy layer and the core, the inhibition layer contacting the core and the zinc alloy layer, and the inhibition layer having an average thickness of greater than or equal to about 10 nanometers to less than or equal to about 30 nanometers.

6. The metallic component of claim 5, wherein the zinc alloy layer comprises less than or equal to 0.05 weight percent aluminum.

7. The metallic component of claim 6, wherein the zinc alloy layer consists essentially of 0.01 to 0.05 weight percent aluminum and the balance zinc.

8. The metallic component of claim 5, the core being formed of transformation-induced plasticity (TRIP) steel.

9. The metallic component of claim 5, wherein the zinc alloy layer consists essentially of 0.01 to 0.08 weight percent aluminum and the balance zinc.

10. The metallic component of claim 5, further comprising a second component spot welded to the steel core having the zinc alloy layer disposed thereon.

11. The metallic component of claim 5, the core being formed of a twinning-induced plasticity (TWIP) steel.

12. A method of creating a component, the method comprising:
    providing a steel core;
    providing a zinc bath consisting of essentially of 0.01 to 0.08 weight percent aluminum and the balance zinc; and
    hot dipping the steel core into the zinc bath to form a zinc coating on the steel core resulting in a zinc-coated steel component, the component comprising:
    a core formed of steel;
    a zinc alloy comprising zinc and aluminum layer disposed on the core, the zinc alloy layer comprising a majority of zinc and less than 0.08 weight percent aluminum; and
    an inhibition layer disposed between the zinc alloy layer and the core, the inhibition layer contacting the core and the zinc alloy layer, and the inhibition layer having an average thickness of greater than or equal to about 10 nanometers to less than or equal to about 30 nanometers.

13. The method of claim 12, further comprising refraining from annealing the zinc-coated steel component in an annealing furnace after the step of hot dipping the steel core into the zinc bath.

14. The method of claim 12, further comprising forming the steel core from a transformation-induced plasticity (TRIP) steel.

15. The method of claim 12, wherein the zinc bath consists essentially of:
    0.01 to 0.05 weight percent aluminum;
    0 to 0.001 weight percent trace elements;
    and the balance zinc.

16. The method of claim 12, further comprising spot welding the zinc-coated steel component to a second component to create an assembly having a spot weld joint.

\* \* \* \* \*